UNITED STATES PATENT OFFICE.

EMIL COLLETT AND MORITZ ECKARDT, OF CHRISTIANIA, NORWAY.

DIETETIC CHOCOLATE AND COCOA.

952,418.  Specification of Letters Patent.  Patented Mar. 15, 1910.

No Drawing.  Application filed August 14, 1909.  Serial No. 512,851.

*To all whom it may concern:*

Be it known that we, EMIL COLLETT, doctor of philosophy, a subject of the King of Norway, and MORITZ ECKARDT, doctor of philosophy, a subject of the Emperor of Germany, both residing at Nedre Slotsgade 3, Christiania, Norway, have invented certain new and useful Improvements in Dietetic Chocolate and Cocoa; and we do hereby declare the following to be a full, clear, and exact description of the invention, such as will enable others skilled in the art to which it appertains to make and use the same.

On account of their nutritive value and delicious taste cocoa and chocolate are considered very valuable aliments, strengtheners and beverages. They would be used more frequently, especially by children, sick people and convalescents if it were not for their marked constipating effect, which makes the enjoyment of the above mentioned substances impossible to many people. The remedying of this evil by mixing the substances with laxatives would not be practical, as it is well known that any one laxative should not be taken for a long period, but should be exchanged for others after a time, as the relaxing effects of the remedy will decrease, and finally totally vanish. Moreover only very few laxatives can be mixed with cocoa or chocolate, as the bad taste of the remedies makes their employment undesirable or impossible.

The present invention consists in adding living micro-organisms, especially lactic acid bacteria or ferment, to the cocoa, which organisms multiply in the digestive organs and form in connection with the chocolate ingredients (starch or sugar) or in connection with milk chocolate or milk substances, such substances as are present in sour milk, and which promote digestion.

The quantity of the added acid forming, or fermenting substance, should be regulated, on the one hand according to the acid forming power of the stock of bacteria employed, and on the other hand according to the effect desired, if laxative or indifferent, that is, if the constipating effect of the cocoa material is to be wholly or partly compensated by means of the lactic acid.

As acid forming substances the following may be used: Lactic acid bacteria of various origin and condition or quality. Certain kinds of ferments. Micro-organisms such as those serving in the various countries for the production of sour milk. A mixture of the above-mentioned micro-organisms. Enzyms or ferments which produce a similar fermentation. In other words, the bacteria used are true lactic acid developers, such as streptococci, rod bacteria, and such bacteria which are morphologically and biologically akin to the above-named bacteria and which, like said bacteria, are distinguished as being capable of producing lactic acid from carbohydrates without developing gas.

The invention may, for instance, be carried into practice in one of the following ways: The cocoa material is mixed with organisms capable of surviving, when dried, either alone or together with moisture-absorbing substances, for instance starch or sugar: or, the cocoa or chocolate is mixed with fluid cultures originating from the above-mentioned organisms and the mixture is dried at a low temperature; or, the above-mentioned micro-organisms are added to the milk, and, when these organisms have multiplied to a certain degree the milk is dried at a low temperature, and this milk powder, containing living organisms, is then like other milk powders, employed in the production of milk chocolate.

We claim—

1. In the manufacture of cocoa or chocolate in solid form, the process which consists in incorporating with one or more of the materials contained in commercial cocoa or chocolate, one or more ferments, substantially such as specified, adapted to develop lactic acid from carbohydrates without developing gas.

2. As a new product, indifferent or laxative cocoa or chocolate in solid form containing ferments substantially such as described and capable of developing lactic acid from carbo-hydrates without developing gas.

In testimony that we claim the foregoing as our invention, we have signed our names in presence of two subscribing witnesses.

EMIL COLLETT.
MORITZ ECKARDT.

Witnesses:
HENRY BORDEWICH,
M. ALGER.